March 24, 1942. H. LEOPOLD 2,277,333
PUMP AND MOTOR ASSEMBLY
Filed Jan. 20, 1940
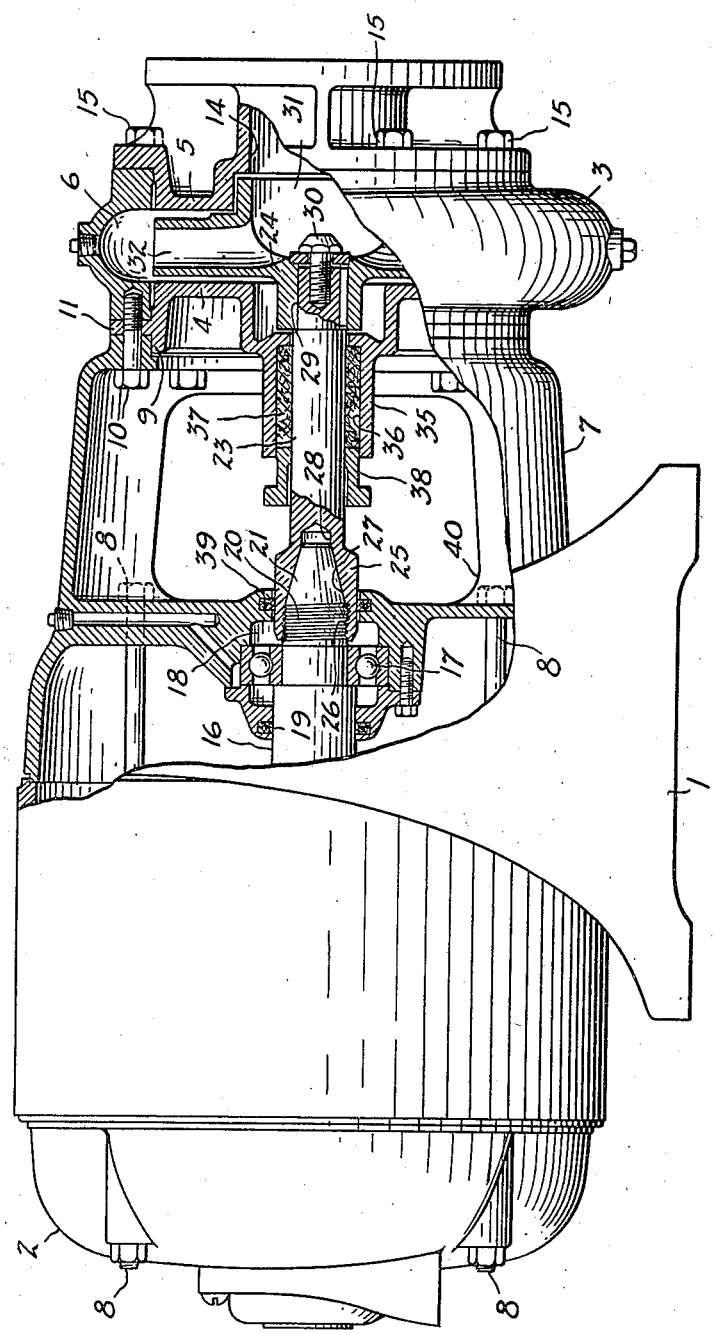
INVENTOR
HUGO LEOPOLD
BY
ATTORNEYS Patented Mar. 24, 1942

2,277,333

UNITED STATES PATENT OFFICE 2,277,333

PUMP AND MOTOR ASSEMBLY

Hugo Leopold, Davenport, Iowa, assignor to Micro-Westco, Inc., Bettendorf, Iowa, a corporation of Delaware Application January 20, 1940, Serial No. 314,871

1 Claim. (Cl. 103—87)

This invention relates to pump and motor assemblies, and more particularly to an improved connection for pumps having a rotor mounted on a shaft and actuated by an electric motor, such, for example, as turbine and centrifugal pumps.

There are numerous applications for pump units which include a supporting structure carrying a pump and a drive motor therefor. Depending upon the amount of water or other fluid to be handled by the pump, and the head against which the pump must operate, the power of the motor is subject to considerable variation. For example, a pump to deliver a given quantity of liquid against a certain head, will require a motor of specified power, but the same pump to deliver the same quantity of liquid against a higher head will require a drive motor of increased power. Similarly, if the same quantity of liquid is to be delivered by the pump against a lower head, a less powerful motor may be employed.

In previous practice, pump manufacturers customarily mounted the pump rotors directly on the motor shafts. Accordingly, where a pump of one size or model was designed for use under different operating conditions, it was necessary for the manufacturer to maintain a plurality of motor sizes in stock, with their shafts machined and finished for the rotor of that particular pump. Hence, for each pump produced, the manufacturer had a separate line of motors in stock. Even though some motors were of sufficient power to drive different pumps, they could not be interchangeably used because the pump rotors would not fit the different motor shafts.

Some pump and motor assemblies have the pump shafts journaled in the pump housing and connected to the motor shaft by means of a flexible coupling. This type of construction, however, is expensive because of the necessity for having additional journals to carry the pump shaft, and because of the coupling cost. Furthermore, a more compact and a neater unit having improved operating characteristics may be provided when the rotor is rigid with the motor shaft.

It is, therefore, a principal object of the present invention to provide a pump and motor assembly in which the rotor of the pump is secured on a shaft which is rigidly connected to the motor shaft, and in which the shaft on which the rotor is mounted may be quickly and easily disconnected from the shaft of the motor.

Another object is to provide a connection for a pump and motor unit which facilitates the interchange of a number of pumps with a single motor without disassembling the parts of the pump or the motor.

Another object is to provide a pump and motor assembly in which the pump rotor is secured on a shaft which is rigidly secured to the motor shaft so as to be substantially wholly supported thereby.

Another object is to provide a pump and drive motor assembly unit which is compact and neat in appearance, simple in design and construction, and relatively inexpensive to manufacture.

Other objects and advantages will become apparent from the following detailed description of a suitable embodiment of the invention made in connection with the accompanying drawing.

The figure is a side elevational view, partly in section, and with parts broken away, showing a pump and drive motor assembly utilizing my improved connection.

The unit comprises a base or supporting structure 1, which may be a part of or integral with the housing for drive motor 2. Annular casing 3 of the pump is mounted between inner and outer cover plates 4 and 5, respectively, and is provided with a pressure developing channel 6, which may be of conventional form.

A supporting bracket 7 of annular or somewhat cylindrical shell-like form is secured to one end of the supporting structure 1, or motor casing, by means of bolts 8. The end of the supporting bracket opposite the motor is provided with a circular recess which telescopically receives an axially extending collar 9, formed on the inner pump cover plate 4.

Bolts 10, having their heads on the inside of the cylindrical bracket 7, extend through drill holes in the end of the bracket, and in radial flange 11 of the cover plate 4, and are threaded into the pump casing 3, thus securing the latter and the cover plate 4 to the outer end of the supporting bracket. The outer cover plate 5, in which is formed central pump inlet passage 14, is secured to the pump casing 3 by bolts 15.

The motor 2 may be of conventional construction, and has a shaft 16 journaled in bearings 17, mounted in the end of the motor housing. In the drawing, only the bearing 17 for the right-hand end of the motor shaft is illustrated, it being understood that the left-hand bearing is of similar construction. Preferably, roller or ball-bearings are used, as illustrated, and a lubricant chamber 18 may be provided around the recess for the bearing, the inner end of the chamber being sealed by a packing ring 19 that embraces the motor shaft 16.

On the outside of the bearing illustrated the motor shaft 16 is formed with a spigot or internal connecting end which includes an externally threaded portion 20, and a frusto-conical taper portion 21 which extends as a continuation of the threaded portion to the tip of the shaft.

A supplementary or extension shaft 23 for pump rotor 24 (to be later described) is provided with a bell-shaped or external connecting end 25, telescopically received on the spigot end of the motor shaft 16. The bell end of the rotor shaft has an internally threaded portion 26 and an internal frusto-conical socket 27 which receive, respectively, the threaded portion 20 and frusto-conical portion 21 of the motor shaft, and a clearance chamber 28 is formed at the inner end of the frusto-conical socket 27.

The threads in the bell and spigot connection of the shafts 16 and 23 are arranged so that the motor shaft is screwed or turned into the pump shaft by rotation of the motor in its normal driving direction. In this manner, the threads press the taper portion 21 of the motor shaft into the frusto-conical socket 27 provided therefor in the bell end 25 of the rotor shaft to assure accurate axial alignment of the rotor shaft 23 with respect to the motor shaft 16.

While the specific dimensions of the frusto-conical portion 21 of the shaft 16 are not critical, it is preferable that this taper portion be of greater length than its widest diameter so as to effect accurate alignment of the shaft, and to prevent wobbling of the rotor shaft during operation.

The rotor 24 is received on a reduced diameter end portion 29 of the shaft 23, and is secured in place by a bolt 30 screwed into the end of the shaft. Any type of rotor may be employed, the specific construction not being a part of the present invention. The rotor shown has a central inlet opening 31 aligned with the pump inlet 14, and has a plurality of radially extending passages 32, which communicate with the pressure developing channel 6 to effect a pumping action by centrifugal force.

At the center of the inner cover plate 4 is formed an axially extending hub portion 35, which surrounds the shaft 23 to provide an annular packing chamber 36, the latter being filled with a suitable packing material 37, of well-known character. A gland or follower 38 is received on the shaft 23 and is threaded into the hub 35 to close the packing chamber 36 and compress the packing material 37 so that the latter tightly embraces the shaft 23 and prevents the flow of liquid along the shaft through the cover plate 4.

It is an important feature of the present invention that the rotor shaft 23 is wholly supported by the motor shaft 16, the latter being rotatably mounted in the journals 17 carried by the supporting structure or motor housing. The stuffing box 35 is not relied upon to support the shaft 23, but only to effect a fluid tight seal with the shaft so as to prevent leakage into or out of the chamber in the pump casing 3. If the stuffing box 35 were employed as a bearing for the shaft 23, excessive wear of either the packing material or the shaft would be likely to occur, resulting in leakage and requiring early replacement of the pump shaft.

It is to be noted that the bell end 25 of the rotor shaft 23 extends into the lubricant chamber 18 of the motor journal. Desirably a sealing ring 39 is carried by the motor journal structure and arranged to embrace the bell end 25 to prevent loss of lubricant from the chamber 18.

One or more side openings 40 may be provided in the supporting bracket 7 to allow access to the packing gland or follower 38, and for use in servicing the pump and rotor assembly.

By the arrangement shown in the drawing and described above, it is possible for a pump manufacturer to make or have made by a motor manufacturer, motors of different size or power, all equipped with a standard shaft having the specific type of spigot end formation set forth above. All of the pumps to be assembled with different size motors, regardless of their size or capacity, have rotor shafts formed with bell ends which will make connection with the standard motor shaft. Accordingly, the pump manufacturer need only keep in stock a single line of motors of each size, all of which will fit and are interchangeable with, all of the pumps with which they may be used.

In the event that after installation of a certain pump it is found that changed conditions require a slightly different capacity, it is possible by use of the present invention to substitute a different motor with a minimum of trouble, and without removing the pump from the liquid circuit in which it is connected. There is thus obtained a material economy which is desirable from the point of view of the public. By the present invention, the unique connection provided for a pump and motor assembly assures a rigid and accurate connection between the pump and motor shafts while permitting facile disassembly of the unit if desired.

The principles of the present invention may be utilized in various ways, numerous modifications and alterations being contemplated, substitution of parts and changes in construction being resorted to as desired, it being understood that the embodiment shown in the drawing and described above is given for purposes of explanation and illustration without intending to limit the scope of the claim to the specific details disclosed.

I claim:

In a fluid pump unit combination including a motor having a housing structure with a bearing in one end thereof and a driven pump assembly having a casing secured to and supported by said structure, a main drive shaft journaled in said bearing and having a free end projecting beyond the end of the structure in the direction of the pump assembly, said free end being formed with an external conical taper, a rotor in the pump casing, an unjournaled stub shaft having one end thereof formed with an internal conical taper to mate with the taper of the main shaft and the other end thereof extending into the casing and rotatably mounting the rotor therewithin, said housing structure including means forming a lubricant chamber surrounding the free end of the main shaft and including sealing means defining a circular opening concentric with the rotational axis of the main shaft, said one end of the stub shaft extending through said opening into the lubricant chamber and having a running fit with the sealing means whereby the circular line of connection between the mating parts of the shafts and at said one end of the stub shaft is disposed within the lubricant chamber to protect the connection against rusting and corrosion and thereby facilitate disassembly, and screw threads on the shafts cooperating to draw the tapered ends thereof together in accurate axial alignment.

HUGO LEOPOLD.